March 25, 1969     F. F. BUCK ET AL     3,434,929

PROCESS FOR PURIFYING PLASMIN

Filed July 12, 1966

DIAGRAMATIC SCHEME OF PROCESS

STARTING MATERIAL, FRACTION $III_2$
CRUDE PLASMINOGEN
↓
WASH WITH DILUTE SODIUM ACETATE,
15 MINUTES    pH 6.5
CENTRIFUGE

- SUPERNATANT DISCARDED
- PRECIPITATE SUSPENDED IN
  (SODIUM CHLORIDE
  (LYSINE HYDROCHLORIDE
  (TRIS(HYDROXYMETHYL)
  AMINOETHANE

4°C.   pH 11.0
STIR 15 MINUTES

ADJUST TO pH 8.5
CENTRIFUGE 1 HOUR
4°C.

- SUPERNATANT AT R.T.
  ADD ACTIVATOR, 5 MIN.
- PRECIPITATE DISCARDED

10X DILUTION, pH 3.0
Δ60°C. 10 HOURS

COOL pH 5.4
ALLOW TO STAND OVERNIGHT,
CENTRIFUGE

- SUPERNATANT DISCARDED
- PLASMIN PRECIPITATE
  SUSPENDED IN
  SODIUM CHLORIDE
  LYSINE HYDROCHLORIDE
  pH 3.8
  CENTRIFUGE

- TO SUPERNATANT
  ADD IN NaOH
  pH 7.0
  LYOPHILIZE
- PRECIPITATE DISCARDED

DRY PLASMIN

INVENTORS.
FRANCIS FREMONTE BUCK
EDWARD CLARENCE DERENZO
BY

*Norton S. Johnson*

ATTORNEY

United States Patent Office 3,434,929
Patented Mar. 25, 1969

3,434,929
PROCESS FOR PURIFYING PLASMIN
Francis Fremonte Buck, Suffern, N.Y., and Edward Clarence De Renzo, Hillsdale, N.J., assignors to American Cyanamid Company, Stamford, Conn., a corporation of Maine
Filed July 12, 1966, Ser. No. 564,690
Int. Cl. C12d 13/10
U.S. Cl. 195—66                                      2 Claims

ABSTRACT OF THE DISCLOSURE

Improved purification and concentration of plasmin (fibrinolysin) is obtained by suspending precipitated sterile plasma in a solution containing both sodium chloride and lysine hydrochlorine at pH 2.5 to 4.2, followed by centrifuging, adjusting the pH to substantial neutrality and lyophilizing.

---

This invention relates to an improved process for purifying plasmin.

Human blood contains a precursor, plasminogen, to a proteolytic enzyme plasmin. The precursor is present in the globulin fraction of normal blood. When activated by bacterial activators, such as streptokinase, staphylokinase, tissue activators such as fibrinolysokinase or urine activators such as urokinase, or by other means, plasminogen is converted into the proteolytic enzyme, which lyses clotted blood and fibrous exudates. Plasmin is useful for liquifying blood clots, in the debridement and drainage of infected wounds or burns, in the treatment of chronic ulcers, and as an anti-inflammatory agent.

Plasmin may be obtained from donor blood, but a more attractive and much cheaper source is human placental tissue, which is normally discarded after delivery. Processes of obtaining plasminogen from placental components are somewhat different than similar methods of obtaining it from human serum because of the many differences in contaminating proteins, lipids, etc., in the two starting materials. Plasminogen has been partially purified from the fraction III$_2$ of placental extract, the raw material being described in an article by Cohn et al. in the Journal of the American Chemical Society, vol. 68, p. 459.

The plasminogen can be prepared by various processes. One such method includes washing with dilute sodium acetate at about pH 6.5-7.0 to remove undesirable material, suspending the precipitate in a solution, for example one containing sodium chloride and lysine hydrochloride and centrifuging to remove insoluble material. The supernatant may now be transformed into plasmin by one of the activators referred to above and then the plasmin may be purified and concentrated further by employing a variety of precipitations and other techniques. It is the last two steps with which the present invention deals, and it may thus be considered as a process for purification and concentration of sterile plasmin from placental material. The sterility is effected by heating to destroy the dangerous hepatitis virus which is present in many blood samples, including those of placental origin. The sterilization of plasmin solutions is described in a copending application No. 305,208, filed Aug. 28, 1963, now U.S. Patent No. 3,284,301.

The final purification of plasmin has been proposed without added components in the solubilizing step. This prior process is described, for example in U.S. Patent No. 3,136,703. The present invention suspends the precipitated sterile plasmin in a solution containing both sodium chloride and lysine hydrochloride at a mildly acid pH, such as 2.5 to 4.2, followed by centrifuging, adjusting the pH to substantial neutrality and lyophilizing. Markedly improved purification and concentration is obtained. It is not known why the use of sodium chloride and lysine hydrochloride together instead of sodium chloride alone or no added material results in markedly increased purification. At first glance one would expect that there would be no substantial difference, and the mechanism by which the lysine hydrochloride increases the removal of undesired material and thus the increase in the potency of the plasmin is not known. Therefore, the present invention is not intended to be limited to any theory of why this improved effect takes place. It is an advantage of the present invention that the exact concentrations of sodium chloride and lysine are not critical. In general, sodium chloride concentration is preferred of the order of 0.1 molar with the lysine hydrochloride approximately 1/5 as concentrated.

The invention will be described more particularly in conjunction with the drawing, which shows a flow sheet, and with a specific example which illustrates a typical procedure starting with the placental fraction, the parts being by weight unless otherwise specified. Both the flow sheet and the specific example illustrate a typical complete process, although the steps up to the production of the partly purified sterile plasmin are not new in the present invention, and the invention is therefore not limited to the exact steps used in producing the sterile plasmin in partially purified form. In the example typical pH's are given for the various steps, but as far as the old steps of producing the partially purified sterile plasmin are concerned, they should be considered only as typical.

EXAMPLE 1

One hundred grams of fraction III$_2$ paste is suspended in 1 liter of 0.1 M sodium acetate and the suspension is stirred in a Waring Blendor for about two minutes. The pH of the suspension is adjusted to 6.5 with 1.0 M NaOH and stirring is continued for an additional 15 minutes. The suspension is centrifuged for one hour at about 12,000 times gravity, after which time the supernatant liquid is discarded. The precipitates containing plasminogen is suspended in 600 milliliters of a solution which is 0.1 M with respect to sodium chloride, 0.02 M with respect to lysine hydrochloride and 0.05 M with respect to tris (hydroxymethyl) aminoethane all adjusted to pH 9.0, is cooled to 4° C. and stirred vigorously in the Blendor for about 30 seconds. The suspension is adjusted to pH 11.0 with 1.0 M NaOH and stirred for an additional 15 minutes after which time the pH is lowered to 8.5 with 1.0 M HCl, keeping the temperature at 4° C. The suspension is centrifuged at about 12,000 times gravity for one hour and the precipitate is discarded.

The supernatant liquid containing plasminogen is warmed to 25-30° C. and converted into plasmin by adding 1 unit of streptokinase for each activator unit of plasminogen. The unit of plasminogen is described in an article by Hummel et al., in Analytical Biochemistry, vol. 11, pp. 532–547 (1965). The streptokinase activity units are determined, as is customary, by a modified Christenson assay as described in the Proc. Soc. Biol. and Med., vol. 46, p. 674.

After the addition of streptokinase the solution is stirred for 5 minutes and then diluted with six liters of distilled water. The pH is adjusted to pH 3 with 4 M HCl. The solution is then heated to 60° C. and held at that temperature for 10 hours, after which time it is cooled to room temperature. Thereafter the cooled solution is adjusted to pH 5.4 with 1 M NaOH and allowed to settle overnight, thereby effecting precipitation of impure plasmin. The bulk of the supernatant is siphoned off and discarded and the remainder is centrifuged at about 12,000 times gravity for thirty minutes. So far the example describes a process which is in general known in the art. The improved final purification of the present invention is as follows.

To solubilize and purify the plasmin, the precipitate from the above step is suspended in 100 ml. of a solution which is 0.1 M with respect to sodium chloride and 0.02 M with respect to lysine hydrochloride and adjusted to pH 3.5 with 1 M HCl. The suspension is agitated and then centrifuged at about 12,000 times gravity for one hour. The precipitate is discarded and the supernatant is adjusted to pH 6.8 to 7.0 by adding 1 M NaOH as required. The solution is shell frozen and lyophilized in a conventional manner.

In order to determine the improvement of the present invention, the final purification steps were repeated with water alone, sodium chloride alone, and with the lysine hydrochloride alone. The results are shown in the following table. The potency is determined by the azocaseinolytic assay of Hummel et al., Analytical Biochemistry, vol. 11, pp. 532–547 (1965). As the true potency depends on the number of proteolytic units based on the protein content, the latter is determined by measuring the absorbance at 280 m$\mu$, a conventional test for protein, and expressing the results as proteolytic units per unit of absorbance at 280 m$\mu$. One absorbance unit is arbitrarily defined as the concentration of protein which gives an absorbance of 1.0 through a light path of 1 cm.

Table.—Treatment of plasmin precipitate

| Solvent: | Proteolytic unit per Absorbance Unit |
|---|---|
| Water | 0.09 |
| 0.1 M sodium chloride | 0.58 |
| 0.02 M lysine·HCl | 0.23 |
| 0.1 M sodium chloride, 0.02 M lysine·HCl | 0.77 |

The figures given are the averages of two trials.

We claim:
1. A process for purifying sterile plasmin from the transformation of plasminogen derived from human placental origin, which comprises suspending the sterile plasmin precipitate at a pH from 3 to 4 in an aqueous solution containing of the order of 0.1 M sodium chloride and 0.02 M lysine hydrochloride, separating solids from liquids, neutralizing the plasmin in the liquid by adjusting the pH to substantial neutrality, and lyophilizing.

2. A process according to claim 1 in which the separation of liquid from solids is by centrifuging.

References Cited

UNITED STATES PATENTS

| 3,168,447 | 2/1964 | Hink et al. | 195—66 |
| 3,234,106 | 2/1966 | Hink et al. | 195—62 |
| 3,274,059 | 9/1966 | Richard | 167—73 |

LIONEL M. SHAPIRO, *Primary Examiner.*